United States Patent [19]

Suga et al.

[11] 4,365,526

[45] Dec. 28, 1982

[54] APPARATUS FOR CONTROLLING LINE PRESSURE OF AUTOMATIC TRANSMISSION

[75] Inventors: Masaaki Suga, Yokohama; Hideo Hamada, Yokosuka, both of Japan

[73] Assignee: Nissan Motor Co., Ltd., Yokohama, Japan

[21] Appl. No.: 151,636

[22] Filed: May 20, 1980

[30] Foreign Application Priority Data

May 21, 1979 [JP] Japan .................................. 54-61514

[51] Int. Cl.³ .............................................. B60K 41/04
[52] U.S. Cl. ......................................... 74/866; 74/843
[58] Field of Search ................. 74/866, 865, 862, 843, 74/877, 861, 856, 867, 872

[56] References Cited

U.S. PATENT DOCUMENTS

| | | | |
|---|---|---|---|
| 3,983,766 | 10/1976 | Forster | 74/866 |
| 4,031,782 | 6/1977 | Miller | 74/866 |
| 4,103,764 | 8/1978 | Iijima | 74/866 X |
| 4,142,613 | 3/1979 | Iijima | 74/866 X |
| 4,174,645 | 11/1979 | Ohmae | 74/866 |
| 4,262,783 | 4/1981 | Scarrott | 74/866 X |

FOREIGN PATENT DOCUMENTS

| | | | |
|---|---|---|---|
| 1314372 | 4/1973 | United Kingdom | 74/866 |
| 1400183 | 7/1975 | United Kingdom | 74/866 |

*Primary Examiner*—Nile C. Byers, Jr.
*Attorney, Agent, or Firm*—Lane, Aitken, Kice & Kananen

[57] ABSTRACT

For an automatic transmission having a line pressure control circuit producing a line pressure corresponding to engine load and an engine brake selecting circuit applying engine brake in response to car brake signal, an apparatus for controlling the line pressure is disclosed for raising the line pressure in response to engine brake instruction signal from the engine brake selecting circuit. The apparatus may include a circuit for reducing the line pressure to a minimum value necessary for torque transmission after a preset time from the aforesaid raising.

7 Claims, 15 Drawing Figures

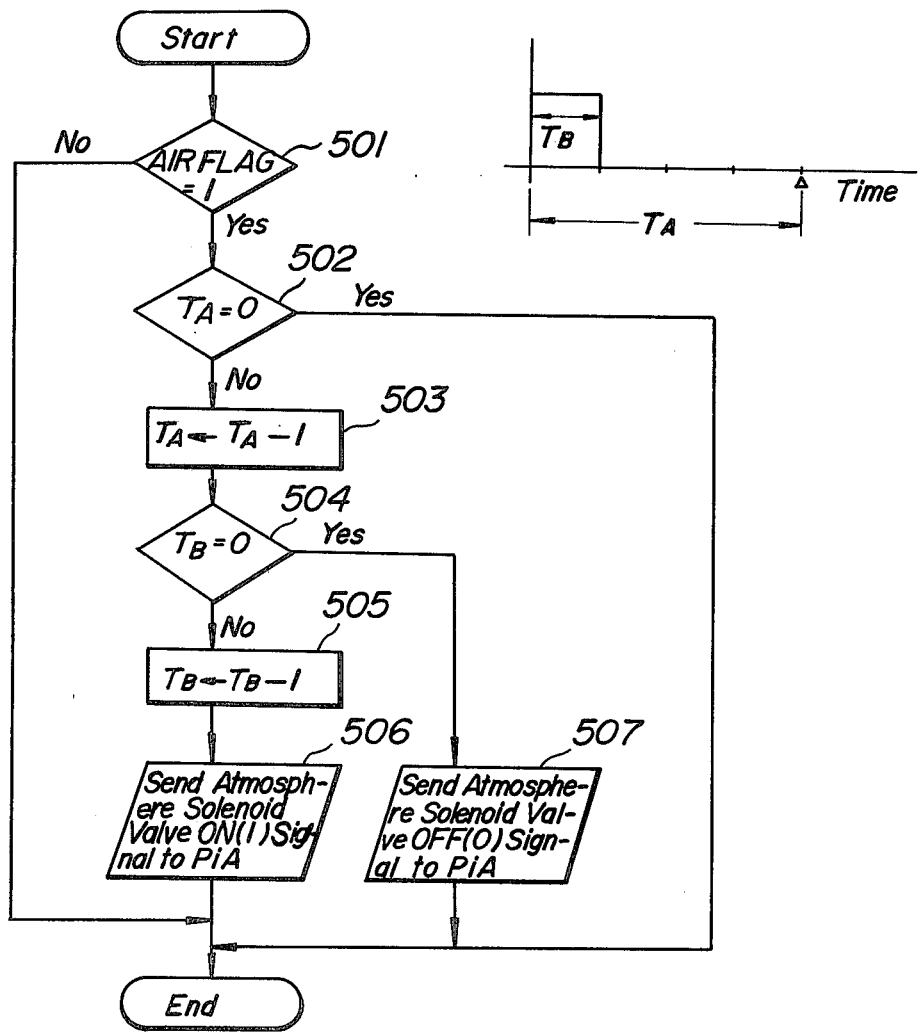

APPARATUS FOR CONTROLLING LINE PRESSURE OF AUTOMATIC TRANSMISSION

BACKGROUND OF THE INVENTION

1. Field of the Invention

This invention relates to an automatic transmission, and more particularly to an apparatus for controlling line pressure of an electronically controlled automatic transmission.

2. Description of the Prior Art

An electronically controlled automatic transmission of the prior art generally includes a line pressure regulating valve for regulating the pressure of operating fluid from an engine-driven oil pump at a predetermined pressure level, and a vacuum throttle valve coacting with a vacuum diaphragm to which a negative pressure corresponding to the degree of throttle opening representing engine load is applied, so that the vacuum throttle valve responds to the aforesaid negative pressure for producing a throttle pressure representing the engine load. The throttle pressure is led to the aforesaid line pressure regulating valve, so as to regulate the line pressure at a level corresponding to the engine load. The line pressure thus regulated is selectively applied to those clutches, brakes, or the like friction elements which are necessary for changing power transmission paths of planetary gear sets or necessary for producing the gear tatio being selected, whereby the friction elements are selectively actuated (in other words, applied or released) for effecting the desired automatic speed change.

In the electronically controlled automatic transmission, it is contemplated to add an automatic engine brake selecting circuit, which circuit detects conditions necessitating the engine brake and generates an engine brake instruction, for automatically effecting shift-down (i.e., selection of a larger speed reduction ratio) and automatically achieving more effective engine brake action. The conditions necessitating the engine brake occur during drive (D) range operation of the automatic transmission at the highest gear ratio thereof, for instance, if a car is accelerated at a rate exceeding a certain value even after the driver of the car releases his foot from an accelerator pedal and depresses a brake pedal.

However, when the engine brake is applied in the aforesaid manner, the driver releases his foot from the accelerator pedal, and the negative pressure acting on the vacuum diaphragm is increased for reducing the throttle pressure and minimizing the line pressure. Accordingly, the torque transmitting capacity of those friction elements which correspond to the low gear ratio to be actuated by the minimized line pressure is also minimized. On the other hand, to carry out the engine brake effectively, the aforesaid friction elements are required to have a large torque transmitting capacity, so that shortage of torque transmitting capacity is inevitably caused. Consequently, the automatic engine brake circuit of the prior art has difficulties in that the friction elements to be actuated during the engine brake tend to slip due to the fact that they can use only small dynamical friction coefficients in the beginning, and hence reliable engine brake action cannot be achieved. Besides, the engine brake selecting circuit has drawbacks in that the aforesaid slip tends to accelerate wear and tear of the friction elements and to shorten their service lives.

SUMMARY OF THE INVENTION

Therefore, the present invention obviates the aforesaid difficulties and drawbacks of the prior art, by providing an improved apparatus for controlling the line pressure of an automatic transmission, which apparatus raises the line pressure of the transmission when applying the engine brake to a sufficiently high level for ensuring reliable operation of the related friction elements without any slip.

It is noted that if the raised line pressure for the engine brake is sustained for an unduly long time, the line pressure may be too high when releasing the engine brake and shifting up the gear ratio to the highest. Accordingly, the capacity of the friction elements for the related gear ratios may become too large, and shift shock may be caused.

In a preferred embodiment of the present invention, the risk of the shift shock for shift up at the end of engine brake is completely eliminated, by reducing the raised line pressure for applying the engine brake upon elapse of a certain period of time after application of the engine brake to a minimum level necessary for ensuring stable torque transmission. This embodiment is based on the knowledge that the raised line pressure is necessary at the time of applying the engine brake, but it is not necessary to maintain the raised line pressure throughout the period of using the engine brake, because once the friction elements relating to the desired lower gear ratio are actuated (or applied) by the aforesaid raised line pressure and relating movement between relatively movable members of the friction elements is removed, the friction elements can use a large static friction coefficient, so that the sustaining of the raised line pressure is not necessary during the engine brake.

BRIEF DESCRIPTION OF THE DRAWINGS

For a better understanding of the invention, reference is made to the accompanying drawings, in which:

FIGS. 5, 6, 7, 9, and 13 are flow charts of partial control programs;

FIG. 14 is a graph showing an example of solenoid valve driving pulse signal.

Like parts are designated by like numerals and symbols throughout different views of the drawing.

DESCRIPTION OF THE PREFERRED EMBODIMENT

Figure 1:
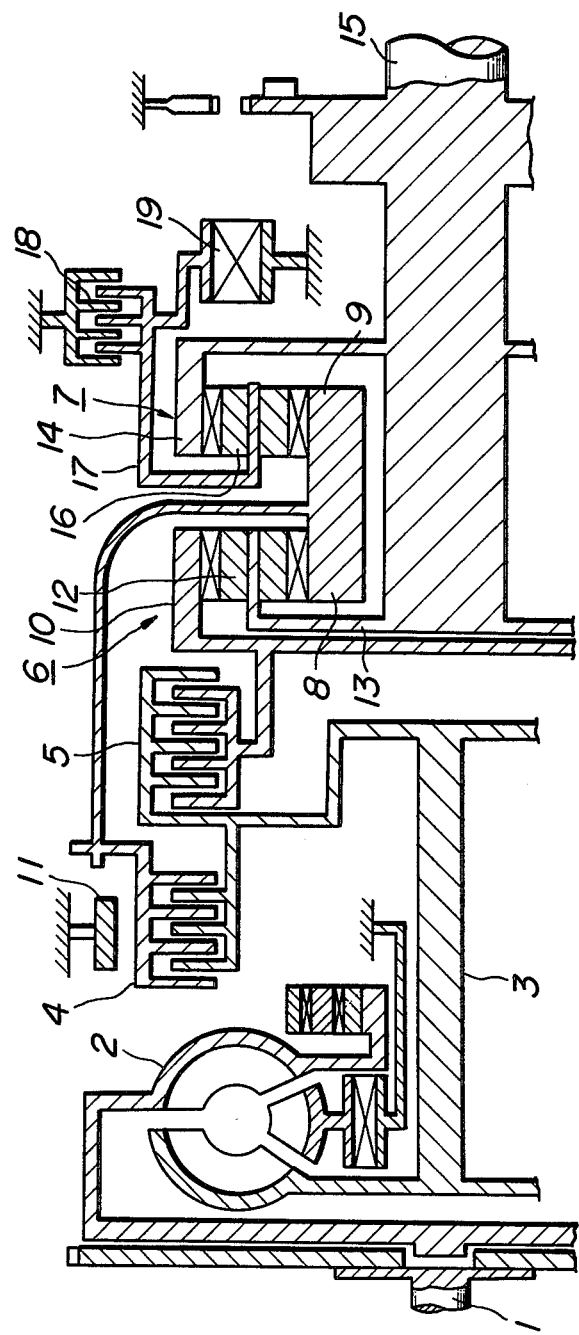
FIG. 1 is a schematic sectional view of a gear train of an automatic speed change gear to which the apparatus of the present invention is applied.

Referring to FIG. 1 illustrating a power transmission system of an automatic transmission to which the present invention can be applied, the input power from an input shaft 1 is transmitted to a torque converter 2 and then to an intermediate shaft 3. The intermediate shaft 3 is connected to a front clutch 4 whose opposite end leads to sun gears 8 and 9 of a front planetary gear set 6 and a rear planetary gear set 7, and the shaft 3 is also connected to a rear clutch 5 whose opposite end leads to an internal gear 10 of the front planetary gear set 6. A band brake 11 can selectively fasten the sun gears 8 and 9. An output shaft 15 is connected to a carrier 13 of the front planetary gear set 6 carrying pinions 12 thereof and to an internal gear 14 of the rear planetary gear set 7. The output shaft 15 delivers output power to the outside of the speed change gear. A low-and-reverse brake 18 selectively fastens a carrier 17 of the rear planetary gear set 7 carrying pinions 16 thereof. A one-way clutch 19 allows the carrier 17 to rotate in only one direction.

Figure 2:
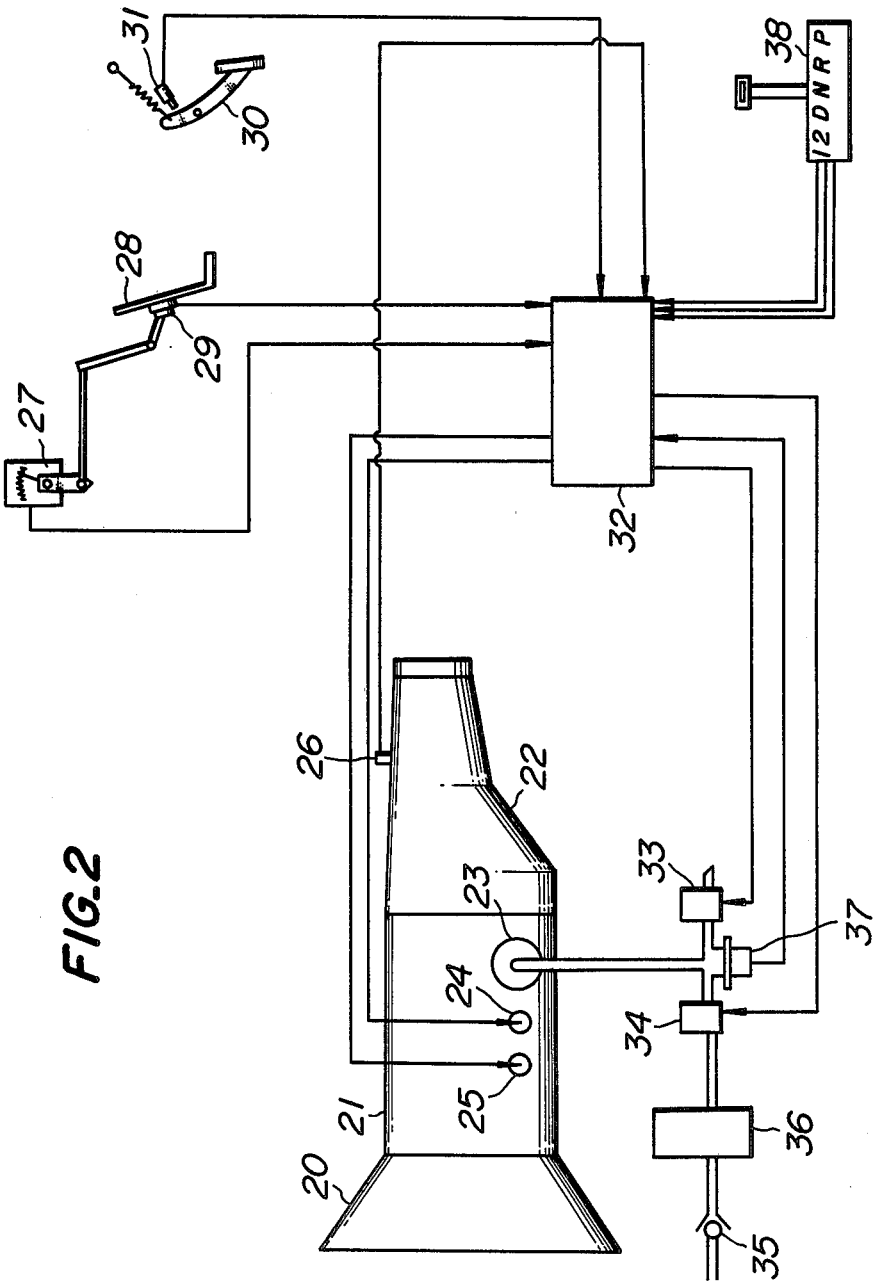
FIG. 2 is a system diagram of electronic control means in an automatic speed change gear having the apparatus of the present invention.

Referring to FIG. 2, a converter cover 20 and a transmission case 21 enclose the torque converter 2 and the gear train portion of the speed change gear, which gear train includes friction elements, i.e., the front clutch 4, the rear clutch 5, the band brake 11, and the low-and-reverse brake 18. The speed change gear case 21 has a rear extension 22 disposed at the rear end thereof. FIG. 2 also shows an electronic control system in general, which system is incorporated in a line pressure control apparatus of the invention mounted on the automatic transmission. The electronic control system comprises a vacuum diaphragm 23, a 1-2 shift solenoid 24, a 2-3 shift solenoid 25, a car speed sensor 26, a throttle opening sensor 27, an idle switch 29 acting as an idle detecting means which relates to an accelerator pedal 28 for detecting release thereof, said idle switch 28 being turned ON upon release of the accelerator pedal 28, a brake switch 31 acting as a brake operation detecting means which coacts with a brake pedal 30 for detecting depression thereof, said brake switch 31 being turned ON upon depression of the brake pedal 30, and a microcomputer 32 connected to the foregoing elements of the electronic control system as shown in FIG. 3.

The inside negative pressure of the vacuum diaphragm 23 is controlled by an atmospheric solenoid valve 33 and a negative pressure solenoid valve 34, which solenoid valves are selectively actuated by signals from the microcomputer 32. When the atmospheric solenoid valve 33 is open, air at the atmospheric pressure is led to the vacuum diaphragm 23 so as to reduce the inside negative pressure thereof. On the other hand, when the negative pressure solenoid valve 34 is open, negative pressure is applied to the vacuum diaphragm 23 from a vacuum tank 36 storing the engine intake negative pressure through a check valve 35, whereby the inside negative pressure of the vacuum diaphragm 23 is increased. The vacuum diaphragm 23 produces a throttle pressure corresponding to the inside negative pressure thereof, by coacting with a vacuum throttle valve (not shown). The throttle pressure is led to a line pressure regulating valve (not shown), so as to regulate the line pressure at a level corresponding to the engine load as explained in the foregoing. Accordingly, the inside negative pressure of the vacuum diaphragm 23 is inversely proportional to the line pressure. A negative pressure sensor 37 electrically detects the inside negative pressure of the vacuum diaphragm 23, so as to determined the line pressure, and the negative pressure signal representing the line pressure thus determined is fed back to the microcomputer 32.

The microcomputer 32 processes various informations, as will be described hereinafter, so as to effect the ON-OFF control of the 1-2 shift solenoid 24 and the 2-3 shift solenoid 25 according to the schedule of Table 1. Whereby, the aforesaid friction elements can be selectively actuated in response to selection of operative positions at a manual valve 38 of the automatic speed change gear, through hydraulic circuits of the prior art. (In Table 1, circles represent friction elements which are selectively actuated by the manual valve.)

Figure 3:
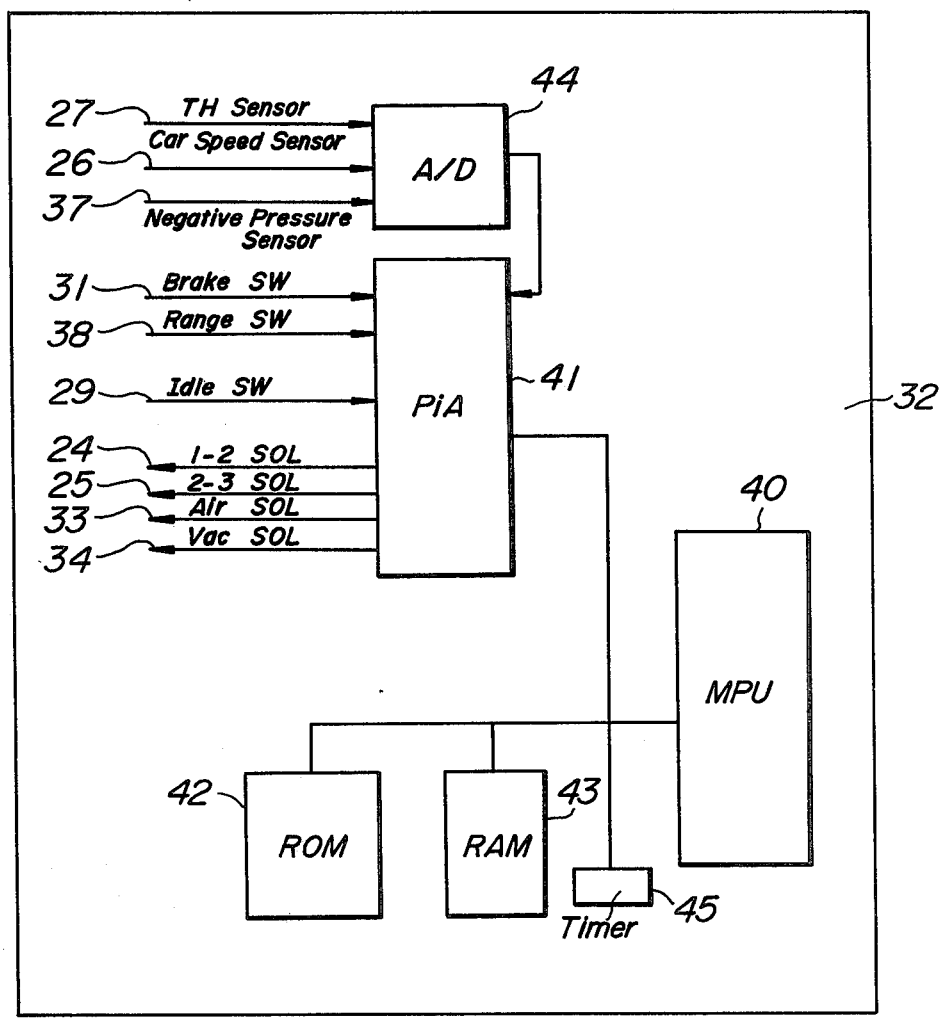
FIG. 3 is a block diagram of a microcomputer in an embodiment of the present invention.

FIG. 3 illustrates an example of the microcomputer 32, which forms an essential portion of the line pressure control apparatus of the invention. In the figure, 40 is a microprocessor unit (MPU) for carrying out various computations and processing, 41 is an input interface circuit (PiA), 42 is a read-only memory (ROM) for storing fixed data or the like, 43 is a random access memory (RAM), and 44 is an analog-digital (A-D) converter. The A-D converter 44 converts the analog signals from the throttle sensor 27, the car speed sensor 26, and the negative pressure sensor 37 into digital signals to be applied to the input interface circuit PiA 41. The input interface circuit PiA 41 also receives signals from the aforesaid brake switch 31, range switch 38, and idle switch 29. The microprocessor unit MPU 40 carries out digital control as will be described hereinafter, depending on the control program stored in the read-only memory ROM 42 and illustrated in FIG. 4. The outcome of the digital control by the microcomputer is delivered from input interface circuit PiA 41 to the aforesaid 1-2 shift valve 24, 2-3 shift valve 25, atmospheric solenoid valve 33, and negative pressure solenoid valve 34 as output signals therefrom. Whereby, the automatic shifting of the speed change ratio and line pressure control are carried out.

TABLE 1

| Selected position of manual valve | | 1-2 shift solenoid | 2-3 shift solenoid | Front clutch | Rear clutch | Low-and-reverse brake | Band brake servo | |
|---|---|---|---|---|---|---|---|---|
| | | | | | | | Applied | Released |
| P range | | OFF | OFF | | | | | |
| R range | | OFF | OFF | 0 | | 0 | | 0 |
| N range | | OFF | OFF | | | | | |
| D range | first gear ratio | ON | ON | | 0 | | | |
| | second gear ratio | OFF | ON | | 0 | | 0 | |
| | third gear ratio | OFF | OFF | 0 | 0 | | 0 | 0 |
| 2 range | second gear ratio | OFF | ON | | 0 | | 0 | |
| | third gear ratio | OFF | OFF | 0 | 0 | | 0 | 0 |
| 1 range | second gear ratio | OFF | OFF | | 0 | 0 | | |

TABLE 1-continued

| Selected position of manual valve | 1-2 shift solenoid | 2-3 shift solenoid | Front clutch | Rear clutch | Low-and-reverse brake | Band brake servo Applied | Band brake servo Released |
|---|---|---|---|---|---|---|---|
| first gear ratio | ON | OFF | 0 | | 0 | | |

Since the present invention relates to the control of the line pressure at actuation of the engine brake, details of other controls will not be discussed here unless related to the engine brake.

Figure 4:
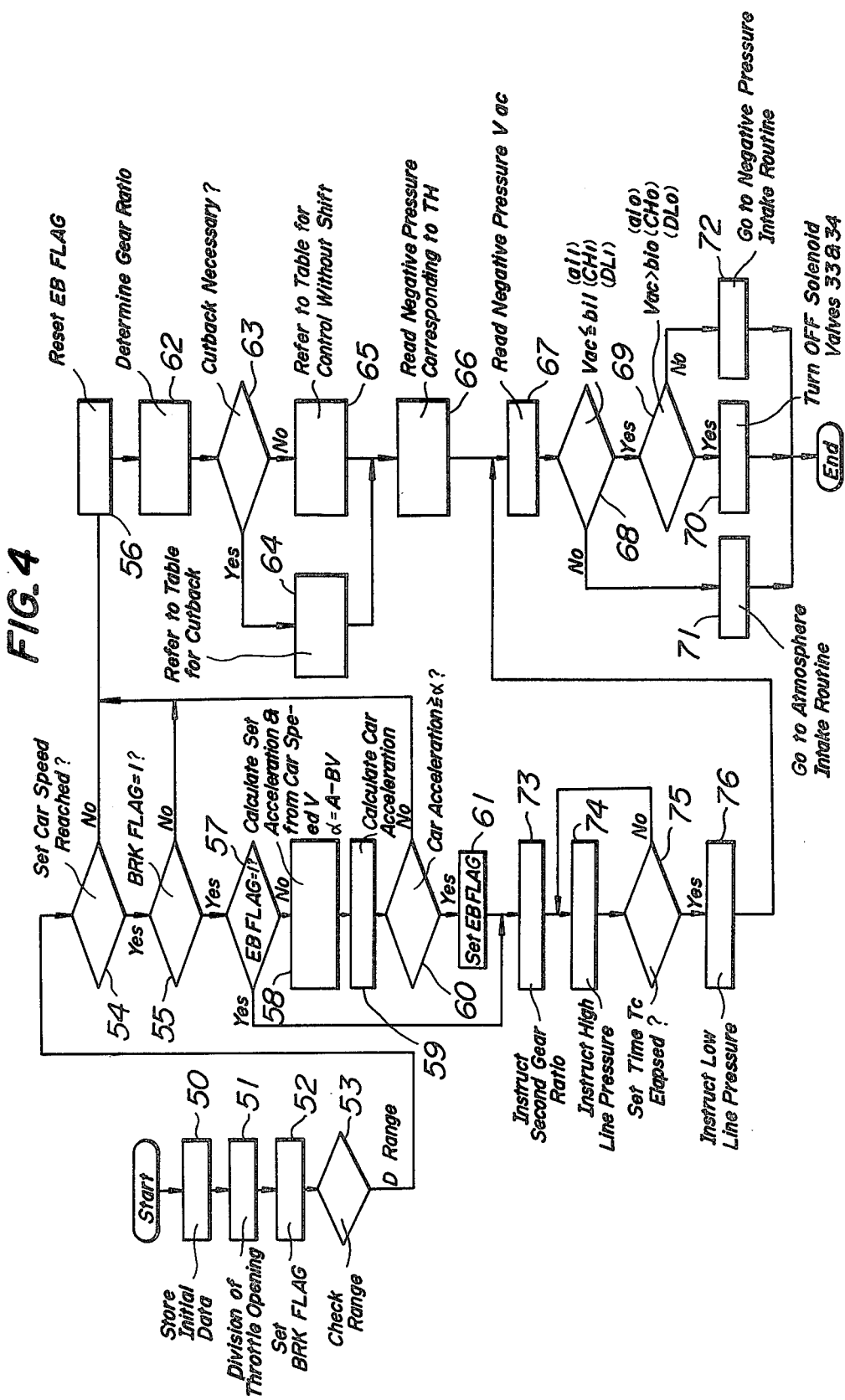
FIG. 4 is a flow chart of overall control program of the microcomputer in the apparatus of the invention.

Referring to FIG. 4, block 50 of the control program indicates that the microprocessor unit MPU 40 reads the throttle signal, the car speed signal, the negative pressure signal representing the inside pressure of the vacuum diaphragm, the brake signal, the range signal, and the idle signal through the input interface circuit PiA 41 at intervals corresponding to an integral multiple of a certain time produced by a timer 45 (see FIG. 3), and the signals thus read are stored in the random access memory RAM 43. The microprocessor unit MPU 40 also carries out fixed time processing in response to signals from the timer 45.

Figure 5:
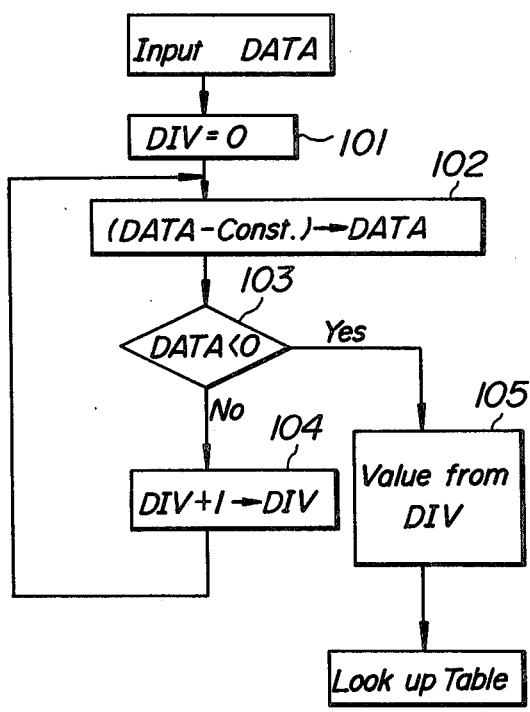

In the next block 51, the microprocessor unit MPU 40 determines to which division value the stored throttle signal belong, which signal represents the degree of opening of the throttle and is stored in RAM 43. The determination of the throttle opening division value is carried out by a program of FIG. 5 in the following manner. In block 101 of FIG. 5, a preceding division value (which is stored at a storing position DIV of RAM 43) is reset to zero. In the next block 102, a constant value which corresponds to the magnitude of one division is subtracted from the value of the input throttle signal or the input DATA, and the difference produced by the subtraction is stored at the storing position DATA of RAM 43. In the next block 103, the aforesaid difference is compared with zero. Let it be assumed here that the input throttle signal or DATA now corresponds to division value 2. Then the aforesaid difference at this moment is larger than zero, and the control program proceeds to a block 104. At this block, value 1 is set at the storing position DIV of RAM 43. The control program comes back to the block 102 again, and the aforesaid constant value is substracted again from the content of the position or address DIV of RAM 43, and the new difference produced by the subtraction replaces the content of the address DIV. The new difference is compared again with zero in the block 103. Under the present assumption, this difference is still larger than zero, and content of the address DIV of RAM 43 is increased to 2 at the block 104 of the program. Returning again to the block 102, the aforesaid constant value is subtracted again from the last difference stored in the address DATA of RAM 43. Under the present assumption, the difference produced by this subtraction becomes smaller than zero, and the control program proceeds from the block 103 to a block 105, so as to read the division value stored in the address DIV of RAM 43 which value is 2 under the present assumption.

Figure 6:
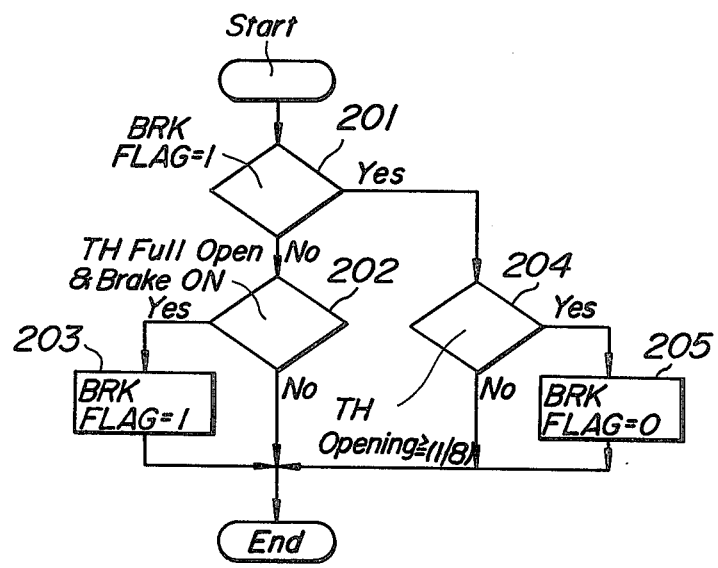

In a block 52 of FIG. 4, the microprocessor unit MPO 40 sets brake flag BRK FLAG, depending on the outcome of evaluations of the division value of throttle opening thus stored in the random access memory RAM 43, the idle signal, and the brake signal. The decision for setting the BRK FLAG is carried out by a control program of FIG. 6 in the following manner.

The block 201 of the program of the figure shows checking of whether the preceding value of the BRK FLAG is 1 or not. Referring to Table 2, the value 1 of BRK FLAG is assumed to correspond to that conditions in which the driver removes his foot from the accelerator pedal for producing the idle condition and the depresses the brake pedal for producing the braking condition. When BRK FLAG is zero, the control program proceeds to a block 202, and if it is assumed that the throttle valve is now fully closed and the brake is now on, then the control program proceeds to a block 203 for setting BRK FLAG 1. On the other hand, if the throttle valve is not fully closed or if the brake is not ON, BRK FLAG is retained at 0. In the block 201, is BRK FLAG is found to be 1, the control program proceeds to a block 204. At this block, if the throttle valve opening is more than ($\frac{1}{8}$) (namely, if the full opening of the throttle valve is divided into 8 equal divisions and the opening of the throttle valve is now more than one such division), the control program proceeds to a block 205 for resetting BRK FLAG to zero; while if the throttle valve opening is less than ($\frac{1}{8}$), BRK FLAG is retained at 1. Thus, the microprocessor unit MPU 40 can set BRK FLAG either at 1 or at 0 in the block 52 of the control program.

TABLE 2

| Throttle opening | Brake | BRK FLAG |
|---|---|---|
| Fully closed | ON | 1 |
| More than ($\frac{1}{8}$) | OFF | 0 |

In the next block 53 of the control program, the microprocessor unit MPU 40 determines which operative position of the manual valve 38 (see FIG. 2) is selected, by using the range signal stored in the random access memory RAM 43, and the control program proceeds to the next block 54 only when the D range is selected. When the manual valve 38 assumes operative ranges other than the D range, control proceeds into programs which are not shown. Since the control for the non-D range of the manual valve 38 is irrelevant to the essential subject matter of the present invention, such control for the non-D ranges will not be dealt with here.

Figure 7:
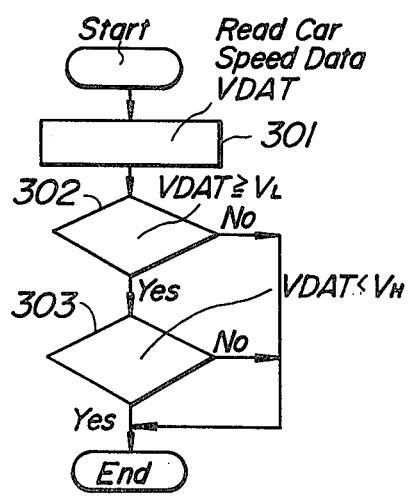
Figure 8:
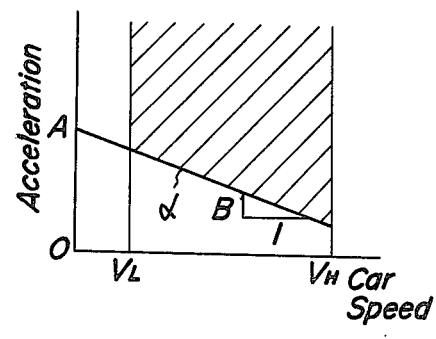
FIG. 8 is a graph showing an engine brake region.

In the block 54, the microprocessor unit MPU 40 determines whether the car speed is in a range where engine brake is necessary or not, based on the control program shown in FIG. 7. The hatched portion of FIG. 8 shows that range of the car speed in which engine brake must be applied. More particularly, car speed slower than the value $V_L$ of FIG. 8 is slow enough for eliminating the need of engine brake, while car speed faster than $V_H$ of the figure may lead to over speed of the engine upon application of the engine brake. Besides, the engine brake is not necessary when the car acceleration is below $\alpha$ of FIG. 8, and the value of $\alpha$ varies with the car speed. In a block 301 of FIG. 7, the microprocessor unit MPU 40 reads the car speed data VDAT which was stored in the random access memory RAM 43 before, for comparing VDAT with the aforesaid critical car speeds $V_L$ and $V_H$ stored in the read-only memory ROM 42 at blocks 302 and 303, respectively. In the block 302, VDAT is compared with $V_L$, and if VDAT$\geq V_L$, the control proceeds to the block 303 where VDAT is compared with $V_H$, and if VDAT$<V_H$, the control program of FIG. 4 proceeds from the block 54 to a block 55. On the other hand, if either of the two conditions VDAT$\geq V_L$ and VDAT$<V_H$ is not satisfied, the control program of FIG. 4 proceeds from the block 54 to a block 56.

In the block 55, the content of BRK FLAG as set in the block 52 is checked, and if BRK FLAG=1, the control program proceeds to a block 57, while if BRK FLAG=0, the control program proceeds to the aforesaid block 56. The block 57 checks whether engine brake operation already started with downshift from the highest gear ratio, by determining whether an engine brake flag EB FLAG (to be explained in detail later) has been already set at 1 or not. If the condition of EB FLAG=1 is not present, the control program proceeds to a block 58.

In the block 58, the microprocessor unit MPU 40 reads the car speed V stored in the random access memory RAM 43, for carrying out arithmetic operation of A-BV by using constants A and B stored in the read-only memory ROM 42. Whereby, the value of the acceleration α of FIG. 8 for the car speed V at the moment is determined. In the next block 59, the control program calculates the car acceleration. More particularly, the microprocessor unit MPU 40 receives interruption signals from the aforesaid timer 45 at certain time intervals, and reads the car speed data from the random access memory RAM 43 each time the interruption signal is received, for determining the difference between the car speed data thus read and that at the time of the preceding interruption signal. The car acceleration is given by dividing the difference thus determined by the aforesaid certain time interval. In a block 60 of the control program, this car acceleration is compared with the set acceleration α, and if (the car acceleration)$\geq \alpha$, the control proceeds to a block 61 for sending out an engine brake instruction by setting the engine brake flag EB FLAG at 1. On the other hand, if (the car acceleration)$<\alpha$, the control proceeds to the block 56.

Upon receiving an input signal from any one of the blocks 54, 55 and 60, the block 56 resets the engine brake flag EB FLAG to zero and proceeds to the following regular program for executing the determination of the gear ratio shift and the line pressure control.

Figure 9:
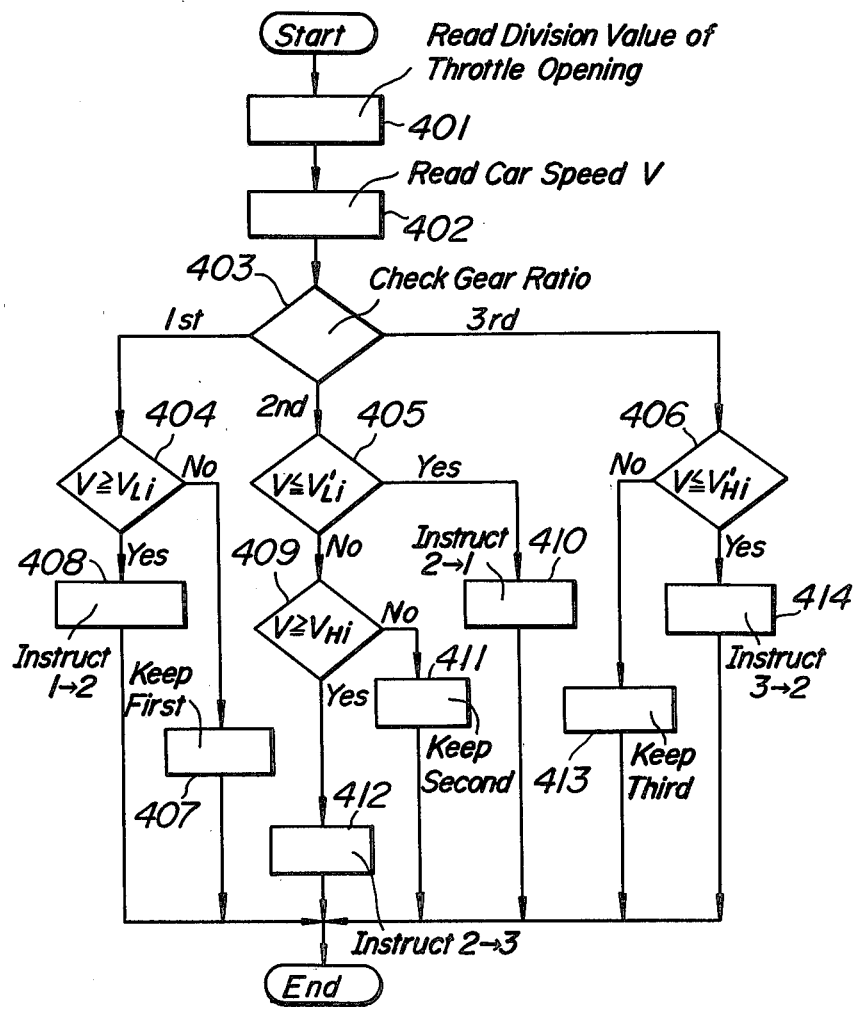
Figure 10:
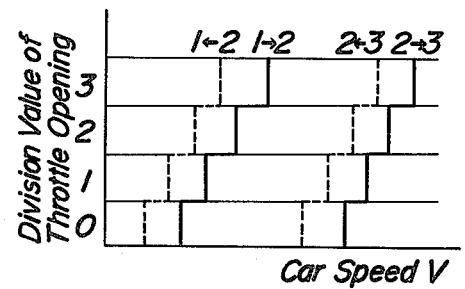
FIG. 10 is a graph showing conditions for shifting the gear ratios.

In a block 62 of FIG. 4, the gear ratio is determined in accordance with the control program of FIG. 9. In a block 401 of FIG. 9, the division value of throttle opening as determined in the block 51 of FIG. 4 is read, and the next block 402 reads the car speed V from the random access memory RAM 43. In a block 403, the control program checks the current gear ratio, for selecting one of blocks 404 through 406 for different gear ratios, respectively. Gear ratio shift points for each of the division values of throttle opening are stored in the read-only memory ROM 42, as shown in FIG. 10. In the following description, it is assumed that, for each division value of throttle opening i, the shift point for 1→2 (from the first gear ratio to the second gear ratio, similar notations will be used hereinafter) is designated by $V_{Li}$, the shift point for 1←2 is designated by $V_{Li'}$, the shift point for 2→3 is designated by $V_{Hi}$, and the shift point for 2←3 is designated by $V_{Hi'}$, respectively.

When the transmission is at the first gear ratio, the block 404 compared the car speed with the shift point $V_{Li}$, and if the condition of $V \geq V_{Li}$ is not satisfied, the control proceeds to a block 407 for sending out an instruction of keeping the first gear ratio, while if $V>V_{Li}$, the control proceeds to a block 408 for sending out an instruction of shifting up to the second gear ratio. When the transmission is at the second gear ratio, the block 405 compares the car speed V with the shift point $V_{Li'}$, and if the condition of $V \leq V_{Li'}$ is not satisfied, the control proceeds to a block 409, while if $V \leq V_{Li'}$, the control proceeds to a block 410. The block 409 compares the car speed V with the shift point $V_{Hi}$, and if the condition of $V \geq V_{Hi}$ is not satisfied, the control proceeds to a block 411, while if $V \geq V_{Hi}$, the control proceeds to a block 412. The block 410 sends out an instruction for shifting down to the first gear ratio, and the block 411 sends out an instruction for keeping the second gear ratio, and the block 412 gives an instruction for shifting up to the third gear ratio. When the transmission is at the third gear ratio, the block 406 compares the car speed V with the shift point $V_{Hi'}$, and if the condition of $V \leq V_{Hi'}$ is not satisfied, the control proceeds to a block 413 for giving an instruction of keeping the third gear ratio, while if $V \leq V_{Hi'}$, the control proceeds to a block 414 for giving an instruction of shifting down to the second gear ratio.

Thus, the block 62 of the control program of FIG. 4 executes proper decisions for gear shifting in accordance with the shift pattern of FIG. 10 depending on the running condition of the car.

Figure 11:
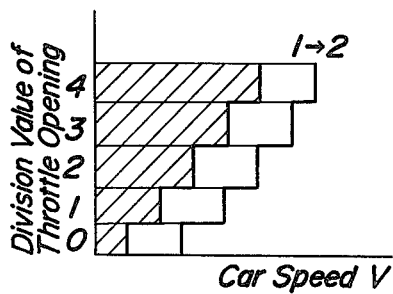
FIG. 11 is a graph showing a cutback region on a throttle valve opening-car speed plane.

When the control program proceeds to a block 63 after the gear ratio determination, the microprocessor unit MPU 40 at first reads the car speed data stored in the random access memory RAM 43 and determines whether cutback is necessary or not depending on whether the car speed data is in a cutback car speed range or not. The cutback car speed range is given by the hatched area of FIG. 11, and upper limit car speed signals $V_{CB}$ for each of the division values of throttle opening are stored in the read-only memory ROM 42. In the block 63, the upper car speed limit signal $V_{CB}$ for the specific division value of throttle opening is read from the read-only memory ROM 42 for comparison with the car speed data VDAT, and if VDAT$<V_{CB}$, the cutback is necessary and the program proceeds to a block 64, while if the condition of VDAT$<V_{CB}$ is not satisfied, the control proceeds to a block 65 by assuming that the cutback is not necessary. In the example of the cutback car speed of FIG. 11, the 1→2 shift points similar to those of FIG. 10 are also shown for comparison.

Figure 12:
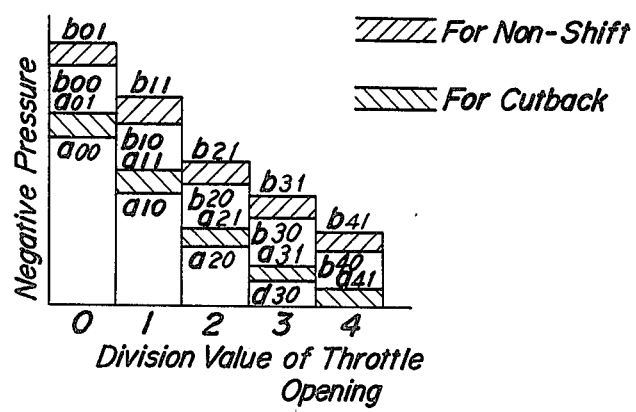
FIG. 12 is a graph showing target values of vacuum diaphragm negative pressure for non-shift and cutback.

FIG. 12 shows limit targets of negative pressure range (target values of line pressure range) in the vacuum diaphragm 23 (see FIG. 2) both for cutback and for non-shift, as variables of the division values of throttle opening, and those limit targets of the negative pressure are stored in the read-only memory ROM 42. When the block 64 is selected, the microprocessor unit MPU 40 refers to the target values of the negative pressure range for cutback, while when the block 65 is selected, the unit MPU 40 refers to the target values of the negative pressure range for non-shift. Whereby, in a block 66, the target values of the negative pressure range for a given division value of throttle opening are read from the read-only memory ROM 42 based on the aforesaid references. In the following description it will be assumed that, for a given division value of throttle opening i, the upper limit target of the negative pressure for cutback is designated by $a_{i1}$, the lower limit target of the negative pressure for cutback is designated by $a_{i0}$, the upper limit target of the negative pressure for non-shift is designated by $b_{i1}$, and the lower limit target of the negative pressure for non-shift is designated by $b_{i0}$.

When the control program proceeds from the block 66 to a block 67, the microprocessor unit MPU 40 reads the negative pressure $V_{ac}$ inside the vacuum diaphragm 23 stored in the random access memory RAM 43. In blocks 68 and 69 of FIG. 4, the negative pressure $V_{ac}$ is compared with the upper and lower limit targets $b_{i1}$, $b_{i0}$ or $a_{i1}$, $a_{i0}$ as read in the block 66. When the block 65 is selected, the block 68 compares $V_{ac}$ with the limit target $b_{i1}$ and the block 69 compares $V_{ac}$ with the limit target $b_{i0}$, so that if the negative pressure $V_{ac}$ is in the desired range between the upper and lower limit targets, i.e., $b_{i0} < V_{ac} < b_{i1}$, the control program proceeds to a block 70, so as to give a signal for instructing the turn OFF of the two solenoid valves 33 and 34 (see FIG. 2) and maintaining the current negative pressure inside the vacuum diaphragm 23 (maintaining the current line pressure). On the other hand, if the condition of $V_{ac} \leq b_{i1}$ is not satisfied in the block 68, i.e., if the negative pressure is higher than the upper limit target, the control program proceeds to a block 71 so as to execute an atmosphere intake routine. Even when the block 68 shows $V_{ac} \leq b_{i1}$, if the condition of $V_{ac} > b_{i0}$ of the block 69 is not satisfied, i.e., if the negative pressure is below the lower limit target, the control program proceeds to a block 72 so as to execute a negative pressure intake routine.

The atmosphere intake routine and the negative pressure intake routine are executed in the following manner.

The atmosphere intake routine will be described at first by referring to FIG. 13. The routine is started each time the interruption signal arrives from the timer 45 (see FIG. 3) at certain time intervals, each of which time intervals is, for instance, a period $t_B$ or a period equivalent to an integral multiple of $t_B$. In a block 501 of the routine, it is checked whether AIR FLAG is 1 or not, namely whether the atmosphere intake routine has been executed or not. As long as the atmosphere intake instruction from the block 68 of FIG. 4 is present, the AIR FLAG is kept as set at 1, so that the routine proceeds to a block 502 for checking whether a reference time $T_A$ is zero or not. Here, the reference time $T_A$ corresponds to an integral multiple of the constant time period signal from the timer 45 (see FIG. 3), and this reference time is an ON-OFF period of the atmospheric solenoid valve 33 (see FIG. 2). The value of the reference time is stored in the read-only memory ROM 42. For simplicity, if the value of the reference time $T_A$ is assumed to be 4 as shown in FIG. 14, $T_A$ is not zero ($T_A \neq 0$) in the beginning, so that the routine proceeds to a block 503. In this block, an arithmetic operation ($T_A - 1 = 3$ in this case) is carried out, and the resultant value of the arithmetic operation is stored in the random access memory RAM 43. In the next block 504, it is checked whether ON time $T_B$ of the atmospheric solenoid valve is zero or not, which time $T_B$ is also stored in the read-only memory ROM 42 like the aforesaid reference time $T_A$. For simplicity, if it is assumed that $T_B$ stored in the read-only memory ROM 42 is 1 as shown in FIG. 14, $T_B$ is not zero in the beginning, so that the routine proceeds from the block 504 to a block 505 for subtracting 1 from the preceding value of $T_B$ (i.e., $T_B - 1 = 0$ in this case). The result of the subtraction at the block 505 is stored in the random access memory RAM 43, and the routine proceeds to a block 506 for giving a driving signal for the atmospheric pressure solenoid valve 33.

As a next interruption signal arrives from the timer 45, the block 501 again checks whether AIR FLAG is 1 or not and the block 502 checks whether $T_A$ is zero or not. Under the aforesaid assumptions, the value of $T_A$ is 3 now, and the routine proceeds to the block 503 for executing the subtraction of $T_A - 1 = 2$, and then to the block 504 for checking whether $T_B$ is zero or not. Under the aforesaid assumptions, $T_B = 0$ now, so that the routine proceeds to a block 507 for giving an instruction for turning OFF the atmospheric pressure solenoid valve. Therefore, the driving signal for the atmospheric solenoid valve is given at the block 506 when $T_B = 1$ as shown in FIG. 14, for opening the atmospheric solenoid valve 33 in response to this driving signal. Similar operation is repeated through the blocks 502, 503, 504, and 507 until $T_A = 0$ is reached, when this particular cycle is completed. However, until the AIR FLAG is reset to zero or until $V_{ac} \leq b_{i1}$ is reached, the block 501 initiates the repetition of the aforesaid cycles during the next reference time $T_A$, for controlling the open and close operations of the atmospheric pressure solenoid valve 33.

The negative pressure intake routine referred to in the block 72 of FIG. 4 is similarly formed to the aforesaid atmosphere intake routine, so as to open and close the negative pressure solenoid valve 34 in a similar fashion. Whereby, the condition of $V_{ac} > b_{i0}$ can be achieved.

Consequently, the negative pressure $V_{ac}$ can be kept in the desired range between the upper limit target value $V_{bi}$ and the lower limit target value $V_{i0}$ thereof, and the line pressure can be kept in the desired range of the line pressure for non-shift time.

On the other hand, when the block 64 is selected instead of the block 65, the block 66 reads the upper limit target of the negative pressure $a_{i1}$ and the lower limit target of the negative pressure $a_{i0}$ for cutback, so as to facilitate the comparison of the negative pressure $V_{ac}$ with such limit targets in the blocks 68 and 69, respectively. In this case, the control of the block 68 through the block 72 is similarly carried out as before, except that the negative pressure $V_{ac}$ is controlled between the limit targets $a_{i1}$ and $a_{i0}$.

Referring to FIG. 4, when the block 57 finds that the engine brake flag EB FLAG is 1 indicating that the engine brake has been applied already, and when the engine brake flag EB FLAG is set at 1 by the blocks 58 through 61 in the aforesaid manner, the control program proceeds to a block 73 for instructing the use of the second gear ratio. As the control program proceeds to a block 74, a high line pressure is instructed. This high line pressure should be high enough for preventing those friction elements from slipping during engine brake which relate to the engine brake. The negative pressure inside the vacuum diaphragm 23 (see FIG. 2) corresponding to the high line pressure is stored in the read-only memory ROM 42 with an insensitive band in the form of upper limit target of negative pressure $CH_1$ and lower limit target of negative pressure $CH_0$. The microprocessor unit MPU 40 reads those upper and lower limit targets $CH_1$ and $CH_0$ from the read-only memory ROM 42 at the block 74 of the control program. In a block 75 of the control program, the negative pressure is compared with the limit targets in a manner similar to that of the blocks 68 and 69 until the elapse of a preset time $T_C$ is confirmed at a block 75. As a result, during the preset time $T_C$ immediately following the dispatch of the engine brake instruction from the block 61, control similar to what has been described hereinbefore by referring to the blocks 68 through 72 is executed, so as to keep the negative pressure $V_{ac}$ inside the vacuum diaphragm (see FIG. 2) in the desired range between the upper and lower limit targets $CH_1$ and $CH_0$. Whereby, the line pressure can be kept at a high line pressure level corresponding to the thus kept negative pressure.

After the elapse of the preset ime $T_C$, the control program proceeds to a block 76 for giving an instruction for low line pressure. The low line pressure thus instructed is somewhat higher than a line pressure at the time of zero throttle opening, and the negative pressure inside the vacuum diaphragm 23 (see FIG. 2) corresponding to this low line pressure is stored in the read-only memory ROM 42 with an insensitive band in the form of upper limit target of negative pressure $DL_1$ and lower limit target of negative pressure $DL_0$. At the block 76, the microprocessor unit MPU 40 reads those upper and lower limit targets $DL_1$ and $DL_0$ from the read-only memory ROM 42, so as to compare the negative pressure $V_{ac}$ with the limit targets in the same manner as described hereinbefore by referring to the blocks 68 and 69. As a result, after the elapse of the present time $T_C$ from the dispatch of the engine brake instruction at the block 61, the control similar to that of the blocks 68 through 72 but with the limit target values of $DL_1$ and $DL_0$ instead of $b_{i1}$ and $b_{i0}$ is executed, so that the negative pressure inside the vacuum diaphragm 23 (see FIG. 2) is kept within the aforesaid preset range between the upper and lower limit targets $DL_1$ and $DL_0$, and the line pressure is also kept at the desired low line pressure corresponding to the thus kept negative pressure.

Figure 15:
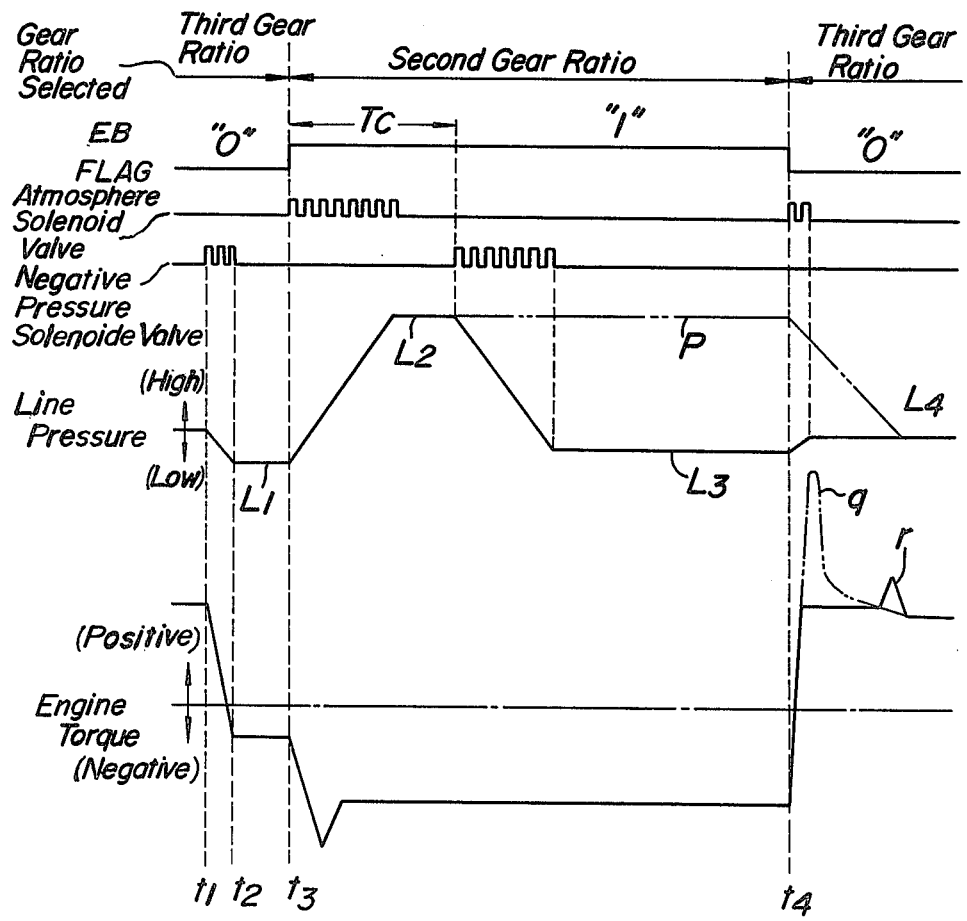
FIG. 15 is a flow chart illustrating the manner in which the line pressure is controlled by an apparatus according to the present invention.

The manner in which the line pressure is controlled by the aforesaid operations will be now described by referring to a time chart of FIG. 15. If the throttle opening is reduced to zero at time $t_1$ during car driving with the D range and the third gear ratio (the highest gear ratio), the line pressure is gradually reduced, by repeated ON-OFF operations of the negative pressure solenoid valve 34 (see FIG. 2) with pulse signals of constant durations in accordance with the line pressure control operation of the aforesaid blocks 62 through 72 for non-shift. Thereby, the minimum line pressure $L_1$ corresponding to the zero throttle opening is reached at time $t_2$, and the aforesaid ON-OFF operations of the negative pressure solenoid valve 34 ceases for keeping the line pressure at the minimum level $L_1$. On the other hand, due to the zero throttle opening, the engine brake action is caused, so that the engine torque is shifted into a negative area, and as the reduction of the car speed is slowed down, the engine torque assumes a constant value. It is assumed that the engine brake flat EB FLAG is set to 1 at time $t_3$ by the operation of the block 61. Then, the instruction for shifting to the second gear ratio is given at the block 73, and the shiftdown of speed change gear to the second gear ratio takes place, and at the same time, the line pressure is set at the preset high level $L_2$ by repeated ON-OFF operations of the atmospheric pressure solenoid valve 33 (see FIG. 2) actuated by pulse signals of constant duration generated by the aforesaid control of the blocks 73 through 75 and 67 through 72. The high line pressure $L_2$ is kept for the aforesaid time period $T_C$. Besides, the aforesaid shift from the third gear ratio to the second gear ratio actuates the engine brake again, and the engine torque considerably increases in the negative direction immediately after the time $t_3$, and then the engine torque increases by an amount corresponding to engine brake shock and thereafter it assumes a constant value. When the aforesaid time period $T_C$ elapsed from the time $t_3$, the line pressure is reduced to a low set value $L_3$ by repeated ON-OFF operations of the negative pressure solenoid valve 34 (see FIG. 2) actuated by the aforesaid pulse signals of the constant duration generated by the actions of the block 76 and 67 through 72, and this low value is kept until time $t_4$ when the EB FLAG is reset to zero at the block 56 upon determination of releasing the engine brake by the block 54, 55 or 60. At time $t_4$, the aforesaid control program of the blocks 56 through 72 presumes for carrying out the regular determination of the gear ratio shifting and the regular line pressure control; for instance, if the accelerator pedal is depressed for effecting light load acceleration, the gear ratio is shifted up to the third ratio and the line pressure is controlled at a value $L_4$ corresponding to the throttle opening by ON-OFF operations of the atmospheric pressure solenoid valve 33 (see FIG. 2) and the engine torque moves into the positive area.

As described in the foregoing, in the apparatus for controlling the line pressure according to the present invention, the line pressure is increased to a high value $L_2$ upon actuation of engine brake for a time period $T_C$ after the moment $t_3$ of actuating the engine brake, so that the friction elements relating to the engine brake (in the case of the power transmission illustrated in FIG. 1, the band brake 11 to be actuated at the second gear ratio) is prevented from slipping, so as to ensure reliable engine brake operation. Thus, the friction and heat generation at the related friction elements are suppressed, and long service life of the friction elements is ensured.

It should be noted here that if the high line pressure $L_2$ is kept until the time $t_4$ and then the line pressure is reduced as shown by the line P of FIG. 15, the line pressure immediately after the time $t_4$ is too high, and the friction elements relating to the shiftup to the third gear ratio (in the case of the power transmission system illustrated in FIG. 1, the front clutch 4) tend to have an excessively large capacity, and the engine torque may have an excessive rise as shown by the curve q of FIG. 15, resulting in a large shift shock. The present invention minimizes the aforesaid shift shock as shown by the curve r of FIG. 15, by reducing the line pressure to a low value $L_3$ upon elapse of a preset time $T_C$ after the moment $t_3$ of actuating the engine brake. During the time $T_C$ after the moment $t_3$ of actuating the engine brake, the friction elements to be actuated for shiftdown to the second gear ratio completes the required changes and can use a large static friction coefficient, so that the reduction of the line pressure in the present invention does not cause any slipping of the related friction elements and does not interfere with the aforesaid operations and effects of the invention.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. In an automotive vehicle having an automatic transmission, with friction elements which are selectively actuated to effect speed changes in said transmission, hydraulic means hydraulically connected to said friction elements for applying fluid under pressure to said friction elements, the torque transmission capability of said friction elements varying with said pressure of said fluid applied to said friction elements, and pressure regulating means operatively connected with said hydraulic means for controlling the pressure of the fluid applied to said friction elements, the improvement comprising control means operatively associated with said transmission and said regulating means and responsive to predetermined operating conditions of said automotive vehicle under which engine braking is desired to automatically cause said transmission to downshift and to cause said pressure regulating means to increase the pressure of the fluid applied to said regulating means in response to said predetermined operating conditions.

2. In an automotive vehicle as recited in claim 1, wherein said control means causes said pressure regulating means to reduce the pressure of the fluid applied to said friction elements upon elapse of a predetermined time interval after raising said pressure in response to said predetermined operating conditions of said automotive vehicle.

3. In an automotive vehicle as recited in claim 1, wherein said control means causes said pressure regulating means to raise the pressure of the fluid applied to said friction elements in response to said predetermined operating conditions of said automotive vehicle to a magnitude sufficient to prevent the friction elements of said automatic transmission relating to engine braking from slipping during engine braking.

4. In an automotive vehicle as recited in claim 2, wherein said predetermined time interval is sufficiently long to ensure actuation of the friction elements of said transmission relating to engine braking whereby said friction elements are prevented from slipping by static friction upon the elapse of said predetermined time interval.

5. In an automotive vehicle as recited in claim 1, wherein said pressure regulating means includes a vacuum diaphragm having an internal negative pressure corresponding to the pressure of said fluid applied to said frictional elements and wherein said pressure regulating means raises the pressure of the fluid applied to said friction elements by selectively communicating atmospheric pressure to the interior of said vacuum diaphragm.

6. In an automotive vehicle as recited in claim 2, wherein said vehicle includes an engine connected with said transmission and having an intake at which said engine generates negative pressure and wherein said pressure regulating means includes a vacuum diaphragm having an interior negative pressure corresponding to the pressure of the fluid applied to said friction elements and wherein said pressure regulating means reduces the pressure of the fluid applied to said friction elements by selectively communicating negative pressure from the intake of said engine to the interior of said vacuum diaphragm.

7. In an automotive vehicle as recited in claim 1, wherein said vehicle includes a vehicle brake and a vehicle accelerator and wherein said predetermined operating conditions of said vehicle include application of the vehicle brake and release of the vehicle accelerator.

* * * * *